United States Patent
Kale et al.

(10) Patent No.: US 11,971,815 B2
(45) Date of Patent: Apr. 30, 2024

(54) WRITE BUDGET CONTROL OF TIME-SHIFT BUFFER FOR STREAMING DEVICES

(71) Applicant: Micron Technology, Inc., Boise, ID (US)

(72) Inventors: Poorna Kale, Folsom, CA (US); Christopher Joseph Bueb, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 40 days.

(21) Appl. No.: 17/463,397

(22) Filed: Aug. 31, 2021

(65) Prior Publication Data

US 2023/0066561 A1  Mar. 2, 2023

(51) Int. Cl.
*G06F 12/02* (2006.01)
*G06F 3/06* (2006.01)
*G06F 12/06* (2006.01)

(52) U.S. Cl.
CPC ........ *G06F 12/0246* (2013.01); *G06F 3/0619* (2013.01); *G06F 3/0644* (2013.01); *G06F 3/0656* (2013.01); *G06F 3/067* (2013.01); *G06F 12/063* (2013.01); *G06F 12/0646* (2013.01); *G06F 2212/7201* (2013.01); *G06F 2212/7211* (2013.01)

(58) Field of Classification Search
CPC ............... G06F 12/0246; G06F 12/063; G06F 12/0646; G06F 3/0619; G06F 3/0644; G06F 3/0656; G06F 3/067; G06F 2212/7201; G06F 2212/7211
See application file for complete search history.

(56) References Cited

U.S. PATENT DOCUMENTS

| 10,871,910 | B1* | 12/2020 | Alrod | G06F 3/0619 |
| 2008/0177975 | A1* | 7/2008 | Kawamura | G06F 16/2282 711/E12.002 |
| 2010/0287328 | A1* | 11/2010 | Feldman | G11C 16/3495 711/E12.001 |
| 2011/0251987 | A1* | 10/2011 | Buchheit | H04N 21/4331 707/769 |
| 2012/0166723 | A1* | 6/2012 | Araki | G06F 12/0246 711/E12.019 |
| 2015/0143035 | A1* | 5/2015 | Choi | G06F 3/0661 711/103 |

(Continued)

*Primary Examiner* — Nanci N Wong
(74) *Attorney, Agent, or Firm* — Greenberg Traurig

(57) ABSTRACT

A technique to control write operations in a logical partition. For example, a device can receive a user specified write threshold for the logical partition that is hosted on a pool of memory cells shared by a plurality of logical partitions in wear leveling. An accumulated amount of data written into the memory cells according to write requests addressing the logical partition is tracked. In response to the accumulated amount reaches the write threshold, further write requests addressing the logical partition can be blocked, rejected, and/or ignored. For example, the logical partition can be used to buffer data for time shift in playing back content streaming from a server. Write operations for time shift can be limited via the user specified threshold to prevent overuse of the total program erasure budget of the pool of memory cells shared with other logical partitions.

20 Claims, 6 Drawing Sheets

(56) References Cited

U.S. PATENT DOCUMENTS

| | | | |
|---|---|---|---|
| 2016/0034206 A1* | 2/2016 | Ryan | G06F 3/064 |
| | | | 711/103 |
| 2016/0092353 A1* | 3/2016 | Swanson | G06F 12/0238 |
| | | | 711/147 |
| 2016/0342609 A1* | 11/2016 | Jibbe | G06F 16/128 |
| 2017/0046795 A1* | 2/2017 | Layman | G06F 21/6245 |
| 2017/0235677 A1* | 8/2017 | Sakaniwa | G06F 12/0895 |
| | | | 711/119 |
| 2018/0173430 A1* | 6/2018 | Kanno | G06F 12/0246 |
| 2018/0359334 A1* | 12/2018 | Shimizu | H04L 67/568 |
| 2019/0198113 A1* | 6/2019 | Ben-Rubi | G06F 3/0679 |

\* cited by examiner

WRITE BUDGET CONTROL OF TIME-SHIFT BUFFER FOR STREAMING DEVICES

TECHNICAL FIELD

At least some embodiments disclosed herein relate to memory systems in general and more particularly, but not limited to techniques to control write operations in memory systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
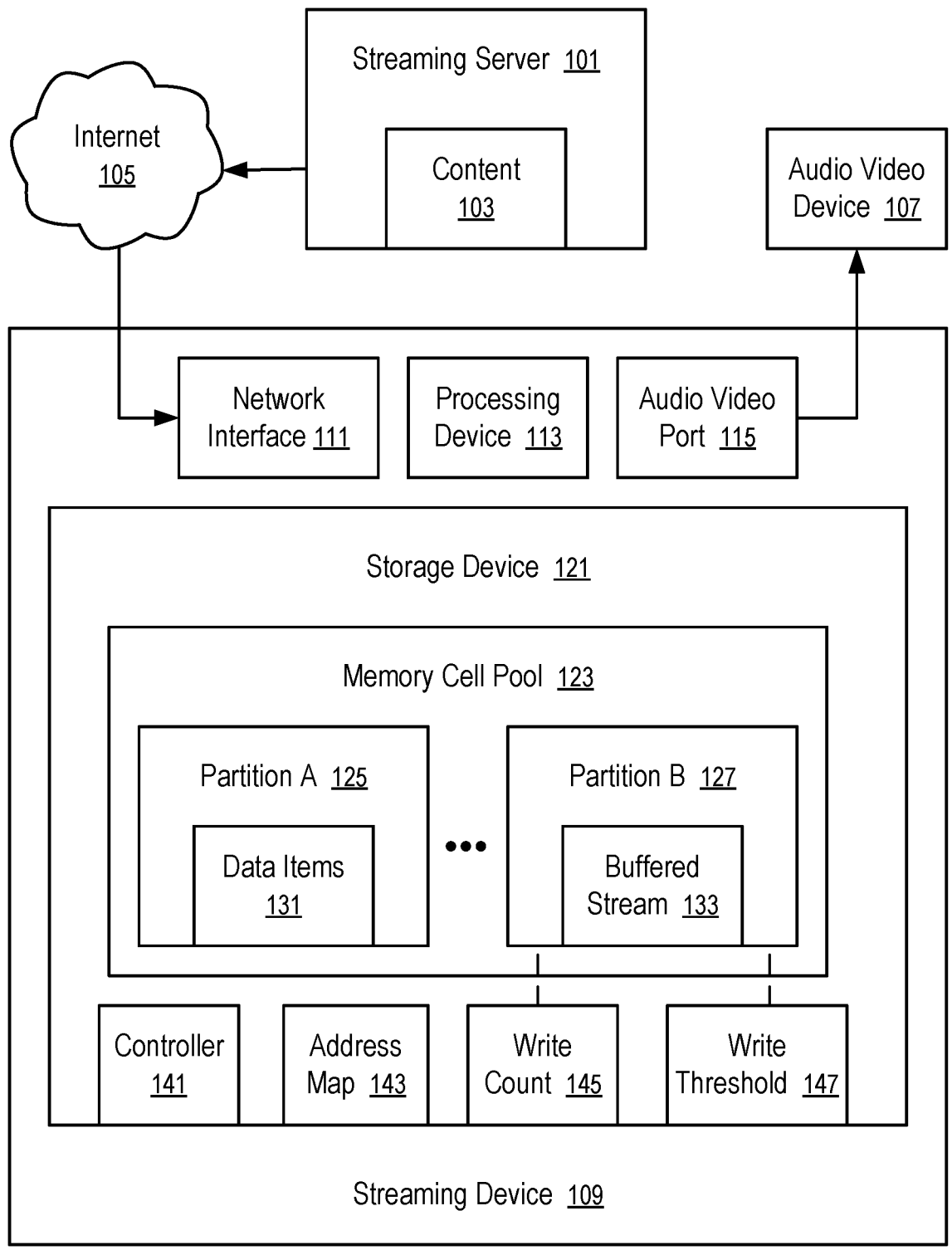
FIG. 1 shows a content streaming system having a user configurable option to control write operations performs in a logical partition that shares memory cells with other logical partitions according to one embodiment.

At least some aspects of the present disclosure are directed to a memory sub-system with techniques to control write operations, according to a user configurable option, in a portion of the memory sub-system that is used to buffer data in time shift operations in content streaming services and/or other write intensive operations.

A storage device used in streaming applications (e.g., streaming devices, Set-Top-Box, and TV) can be configured to provide multiple logical partitions or namespaces on a shared physical pool of non-volatile memory cells. The partitions or namespaces can be used for different purposes. One of the partitions or namespaces can be used to buffer data for time-shift operations. In a time-shift operation, a portion of a media stream received in a streaming device is stored, instead of being played back substantially in real time. Using the buffered portion of the media stream, the time of playing back the content, such as a video clip or a song, be shifted away from the time of receiving the content, enabling operations such as rewind, fast forward or backward, etc. However, the flexibility of the logical partitions sharing the total useful life of the pool of memory cells can become a drawback when time-shift writing operations in a logical partition or namespace consume or use up the entire write budget of the pool of memory cells. After the entire write budget of the pool of memory cells is consumed, the pool of memory cells can become unreliable in writing new data for subsequent retrieval, impacting not only the time-shift operations but also operations of other logical partitions or namespaces that share the same pool of memory cells. In some instances, completely disabling the write operations configured on the same pool of memory cells can make the streaming device nonfunctional or nonoperational.

At least some aspects of the present disclosure address the above and other deficiencies and/or challenges by selectively disabling write operations in a logical partition or namespace according to a configuration parameter. For example, a configuration option can be presented to a user to receive the configuration parameter indicative a threshold amount of write operations that are allowed to be performed in the logical partition or namespace, such as a local partition or namespace configured for time-shift buffering operations and/or other write-intensive operations. The storage device tracks the amount of write operations performed in the partition or namespace. When the tracked amount of write operations reaches the threshold amount, the storage device can discard, block, or reject further write commands in the partition or namespace. Thus, the remaining write budget of the pool of memory cells shared among logical partitions or namespaces can be preserved to support write operations in other logical partitions or namespaces.

Examples of storage devices and memory modules as memory sub-systems are described below in conjunction with FIG. 4. In general, a host system can utilize a memory sub-system that includes one or more components, such as memory devices that store data. The host system can provide data to be stored at the memory sub-system and can request data to be retrieved from the memory sub-system.

The data storage media in a streaming device (e.g., to stream music, audio, and/or video content) can have a system region and a user region. The memory cells in the system region can be used to store firmware or software, an operating system, application programs, etc. The memory cells in the user region can be divided into multiple logical partitions. Some of the logical partitions can be used to store application programs, activity logs, and/or error logs, etc.; and some of the logical partitions can be used to buffer content for time shift operations, for storing downloaded content, and/or for other write intensive operations.

For example, memory cells formed in an integrated circuit device can be used to provide the data storage media in the streaming device. Memory cells in the system region can be configured to store data in a single level cell (SLC) mode for enhanced reliability and endurance. Memory cells in the user region can be configured to store data in a triple level cell (TLC) mode for an enlarged data storage capacity. However, the endurance of the memory cells operating under the TLC mode is reduced, allowing a reduced number of program/erasure (PE) cycles before the memory cells become unreliable.

The logical partitions in the user region can share a same pool of memory cells. Thus, the useful life of PE cycles of the memory cells can be shared among logical partitions having different usage patterns. A controller can spread the write operations across the pool of memory cells through a wear leveling operation such that the rate of consuming the PE budget of the memory cells can be evenly distributed in the pool.

For example, one of the logical partitions in the user region is used to buffer data for time shift. As the streaming device receives the media stream from a source, the streaming media/content is written continuously into the logical partition to allow the user to request the playing back of the content music, audio or video to be paused, to be played backwards, to be played as at a fast rate forwards or backwards, etc.

Although the logical partitions appear to be separate memory regions to a host system of the storage device, a controller of the storage device can map the logical partitions to a same pool of memory cells to allow the logical partitions to share the useful life, or the PE budges, of the pool of memory cells, and thus to prevent premature failure of a particular logical partition.

For example, a logical partition in the user region configured to buffer data for time shift operation (or other write intensive operations) can experience a high rate of writing data into the partition that other logical partitions. When a group of memory cells used for the time shift partition experiences a high level of wear due to a high rate of write operations, the controller/circuitry of the storage device can map the time shift partition to another group of memory cells that have experienced less wear; and another logical partition having a lower rate of write operations can be remapped to the group of memory cells previously used by the time shift partition and thus a high level of wear. Thus, through the wear leveling operations, the time shift partition can automatically access the write budgets or PE budges of the memory cells in the user region.

However, when the time shift partition uses the entire write budgets of the memory cells in the user region, not only the logical partition cannot support further writing data into the pool of memory cells for time shift operations; other logical partitions in the user region cannot support write operations for their designed functionality. Thus, the overuse of write budget by one partition can have adverse effect on the functions relied upon other logical partitions in the user region.

To control the write operations in the time shift partition (or another write intensive partition), a configuration option can be offered to the host system. For example, a control application of the storage device can run in the host system to present the configuration option of the time shift partition. The option allows the user to specify a threshold amount of write operations that are allowed to be performed in the logical partition before further write operations are rejected, ignore, or blocked. In some implementations, the controller of the storage device tracks the accumulated write operations in the individual logical partitions sharing the pool of memory cells in the user region; and the control application of the storage device presents the PE budget usages of the logical partitions and allows the user specify limits for one or more of the logical partitions. Thus, instead of providing a logical partition with the unlimited access to the entire remaining PE budget of the memory cells in the user region, the control application can set user-specified limits of write budgets for one or more of the logical partitions. When the accumulated write operations performed in a logical partition reaches a threshold, the logical partition can be blocked from further writes until the threshold is modified. Thus, when the level of remaining PE cycles in the memory cells of the user region is low, the user of the streaming device may decide how to trade the time shift function for prolonged usage of other functions that rely upon other logical partitions.

Optionally, a threshold can be specified for a logical partition in the form of total bytes having been written into the logical partition. Alternatively, the threshold can be in the form of a specified number of program/erasure cycles in memory cells used to host the logical partition. Alternatively, the threshold can be in the form a percentage of the total program/erasure budget of memory cells in the user region. In some implementations, the threshold is a one-time configurable option. Alternatively, the option is user alterable to, for example, temporarily enable further time shift operations to trade off a further reduced life for functions relied upon other logical partitions.

FIG. 1 shows a content streaming system having a user configurable option to control write operations performs in a logical partition that shares memory cells with other logical partitions according to one embodiment.

In FIG. 1, a streaming server 101 is configured to provide content 103 in the form of a data stream over a computer communication network, such as the Internet 105. A streaming device 109 receives the data stream in the network interface 111. A processing device 113 of the streaming device 109 processes the received data to generate signals or data for presentation of the content 103 on an audio video device 107, such as a television set or a monitor, via an audio video port 115.

For example, the content 103 can include video, audio, and/or music. When the content 103 is played back at a normal speed for presentation on the audio video device 107, the rate of the data representative of the content and is substantially equal to the rate of the data consumption to present the content 103 on the audio video device 107. A minimum amount of data can be buffered in a volatile memory of the streaming device 109 to prevent glitches in real time playing back when the data communication rate through a network interface 111 fluctuates.

However, in some instances, the streaming device 109 can receive a command from a user to pause the playing back of the content to restart playing back after a delay. Further, another command can cause the playing back to go fast forward or fast backward, or to select a time in the duration of playing back of the content and start playing back from the selected time. Such operations that allow a user to shift the time of playing back the content away from the real time streaming of the content 103 can be considered time shift operations of the streaming device 109.

To enable time shifting operations, the streaming device 109 is configured to store at least a portion of the content 103 as a buffered stream 133. The buffered stream 133 has a large amount of data and thus is typically stored in a storage device 121 having a pool 123 of memory cells formed on one or more integrated circuit dies.

For example, when receiving a portion of the content 103 from the streaming server 101, the processing device 113 can write it into a partition 127 in the storage device 121.

The partition 127 is a logical portion of the storage capacity of the pool 123 of memory cells. A controller 141 of the storage device 121 uses an address map 143 to convert the logical address in the partition 127 into physical address of memory cells in the pool 123. For example, to write a data item in a partition (e.g., 125 or 127), the processing device 113 specifies a logical address in the partition (e.g., 125 or 127); and the address map 143 is used to convert the logical address in the partition (e.g., 125 or 127) into a physical memory address of memory cells in the pool 123. Since the same logical address in the partition (e.g., 125 or 127) can be mapped to different physical memory address of memory cells in the pool 123, the address map 143 allows the partition 127 to be hosted on a changing set of memory cells in the pool 123. Through wear leveling, the controller 141 can distribute write operations directed into the partition 127 across the memory cells in the pool 123.

When additional content 103 is streamed from the server 101, an old stream buffered in the partition 127 can be erased to make room for a new buffered stream 133. When new data is written into the partition, the memory cells allocated to host the partition 127 are erased and programmed to store the new data being written into the storage device 121. Thus, each write operation consumes at least one program/erasure (PE) cycle from the PE budget of a memory cell in the pool 123. The sum of the PE budget of the memory cells in the pool 123 represents the total writes the pool 123 can support reliable before the entire pool 123 is considered unreliable and thus having reached the end of its life.

The memory cell pool 123 can host multiple partitions 125, ..., 127. In some implementations, the partitions 125, ..., 127 are implemented as namespaces hosted in a user region of the storage device 121; and a system region of the storage device 121 can have a separate set of memory cells outside of the pool 123. The system region can be used to store data that require high reliability, such as the firmware to be executed by the controller 141 and/or at least a portion of software to be executed by the processing device 113.

In FIG. 1, a write threshold 147 can be specified for the partition 127. The controller 141 tracks the count 145 of accumulated write operations performed in the partition 127. When the write count 145 reaches the write threshold 147, the controller 141 can block, reject, or ignore further write commands having addresses in the partition 127. Blocking writes into the partition 127 can disable the time shift operations of the streaming device 109, but can preserve a portion of the useful life of the memory cell pool 123 for other functions that rely upon writing data items 131 into other partitions (e.g., 125) hosted in the same memory cell pool 123.

In some instances, the user of the streaming device 109 can throttle the consumption of the useful life of the memory cell pool 123 by incrementally increasing the write threshold 147. By monitoring the useful life of the memory cell pool 123 consumed by the partition 127 (and its associated function, such as time shift), a surprise can be avoided in unexpectedly seeing the end of the useful life of the memory cell pool 123 and thus the physical/permanent disabling of at least a significant portion of the functions of streaming device 109.

Figure 2:
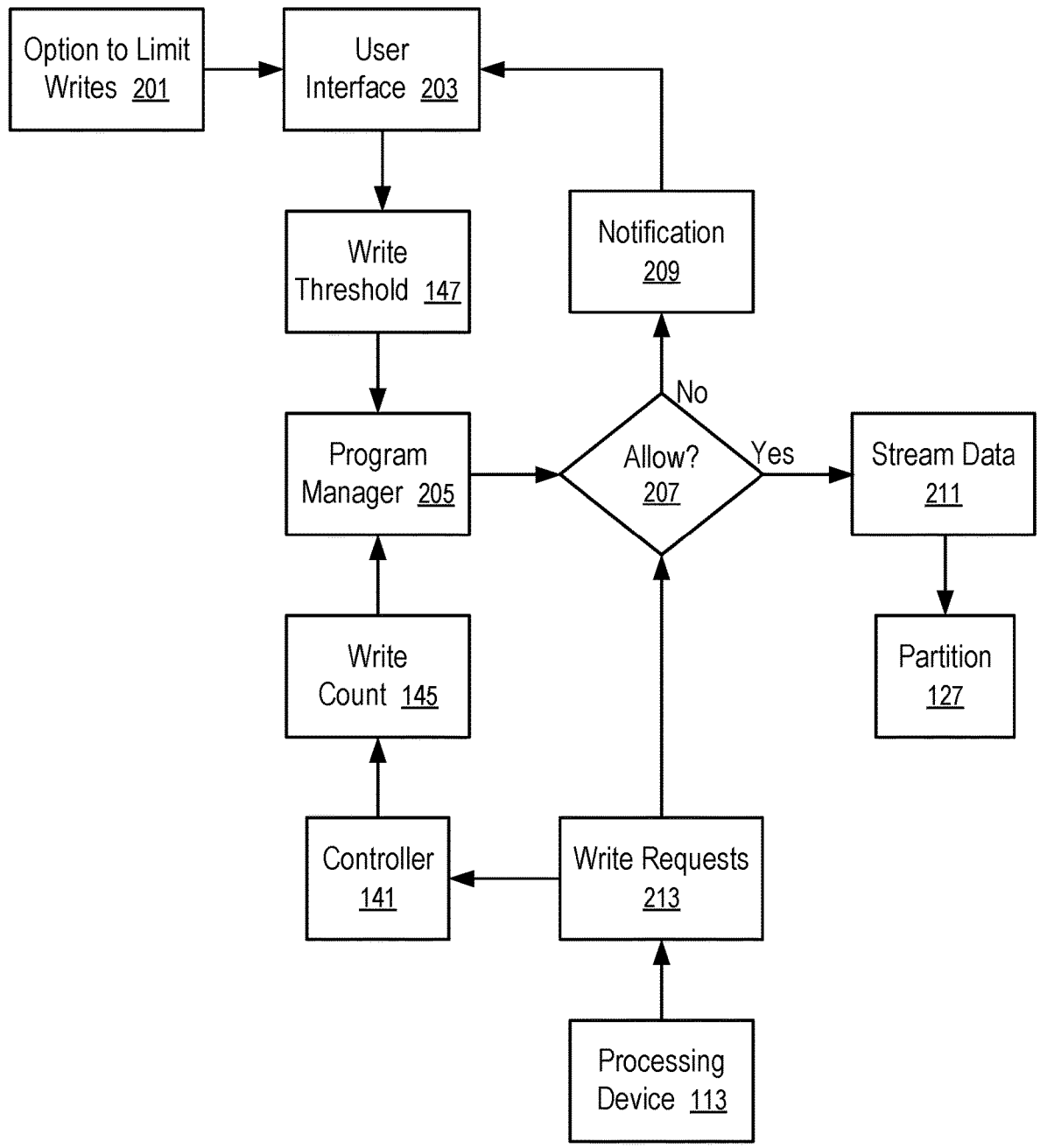
FIG. 2 shows a technique to control writing data into a logical partition according to one embodiment.

FIG. 2 shows a technique to control writing data into a logical partition according to one embodiment. For example, the technique of FIG. 2 can be implemented in the storage device 121 of FIG. 1.

In FIG. 2, a user interface 203 is used to present an option 201 to limit writes to a partition 127. Through wear leveling the partition 127 can share useful life of memory cells in a pool 123 with other partitions (e.g., 125).

Through the user interface 203, a user can specify a write threshold 147 for the partition 127. When a processing device 113 (e.g., as part of a host system of the storage device 121) sends write requests 213 with addresses identifying the partition 127, the controller 141 of the storage device 121 increments the write count 145 for the partition 127 according to the amount of data to be written into the partition 127 according to the write requests 213.

A program manager 205 controls whether to allow the write requests 213 based on the write threshold 147 and the write count 145. When the write count 145 is below the write threshold 147, the program manager 205 can make the determination 207 to allow the stream data 211 in the requests 213 to be programmed/written into memory cells mapped to the partition 127; otherwise, a notification 209 can be sent to the user interface 203 to inform a user that the write threshold 147 for the partition 127 has been reached.

Subsequently, the user can decide how to best utilize the remaining life of a pool 123 of memory cells and the associated functions, such as a time shift function of the streaming device 109 in relation with other functions of the streaming device 109.

Figure 3:
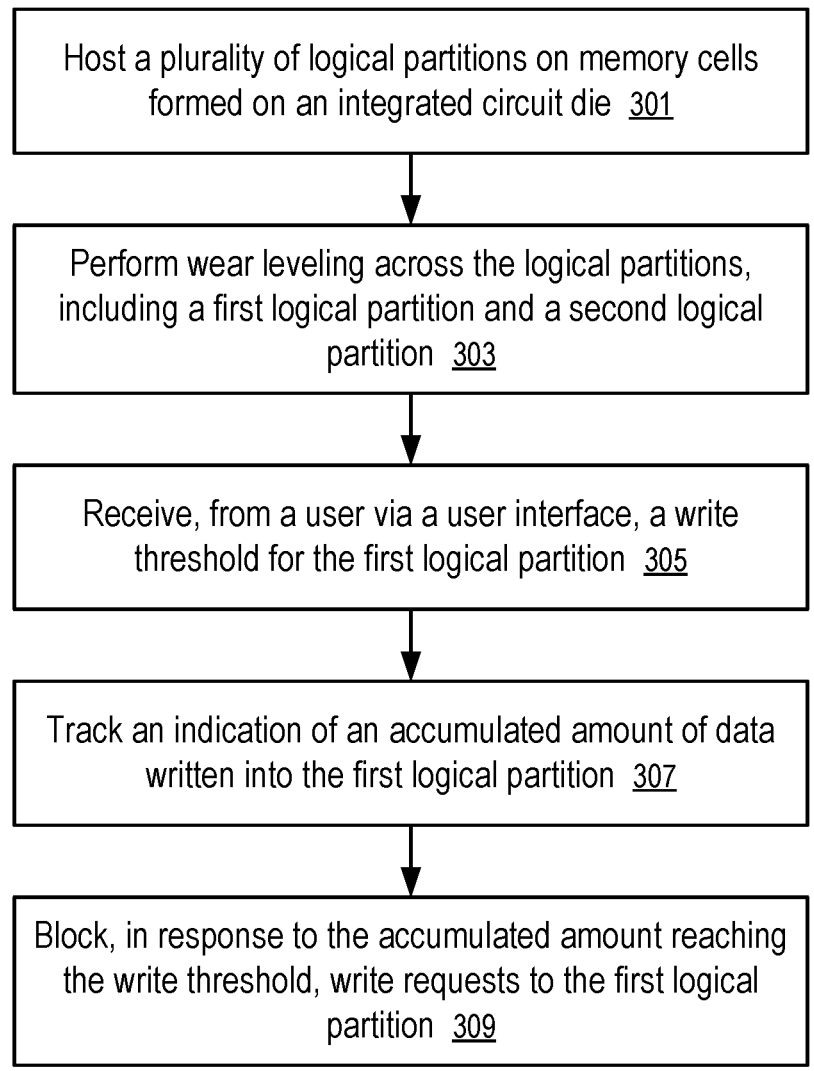
FIG. 3 shows a method to control write budget according to one embodiment.

FIG. 3 shows a method to control write budget according to one embodiment. The methods can be performed by processing logic that can include hardware (e.g., processing device, circuitry, dedicated logic, programmable logic, microcode, hardware of a device, integrated circuit, etc.), software/firmware (e.g., instructions run or executed on a processing device), or a combination thereof. In some embodiments, the method is performed at least in part by the controller 409 of FIG. 4, processing logic in the memory device 419 of FIG. 5, and/or the processing device 403 of the host system 401 of FIG. 4. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 4:
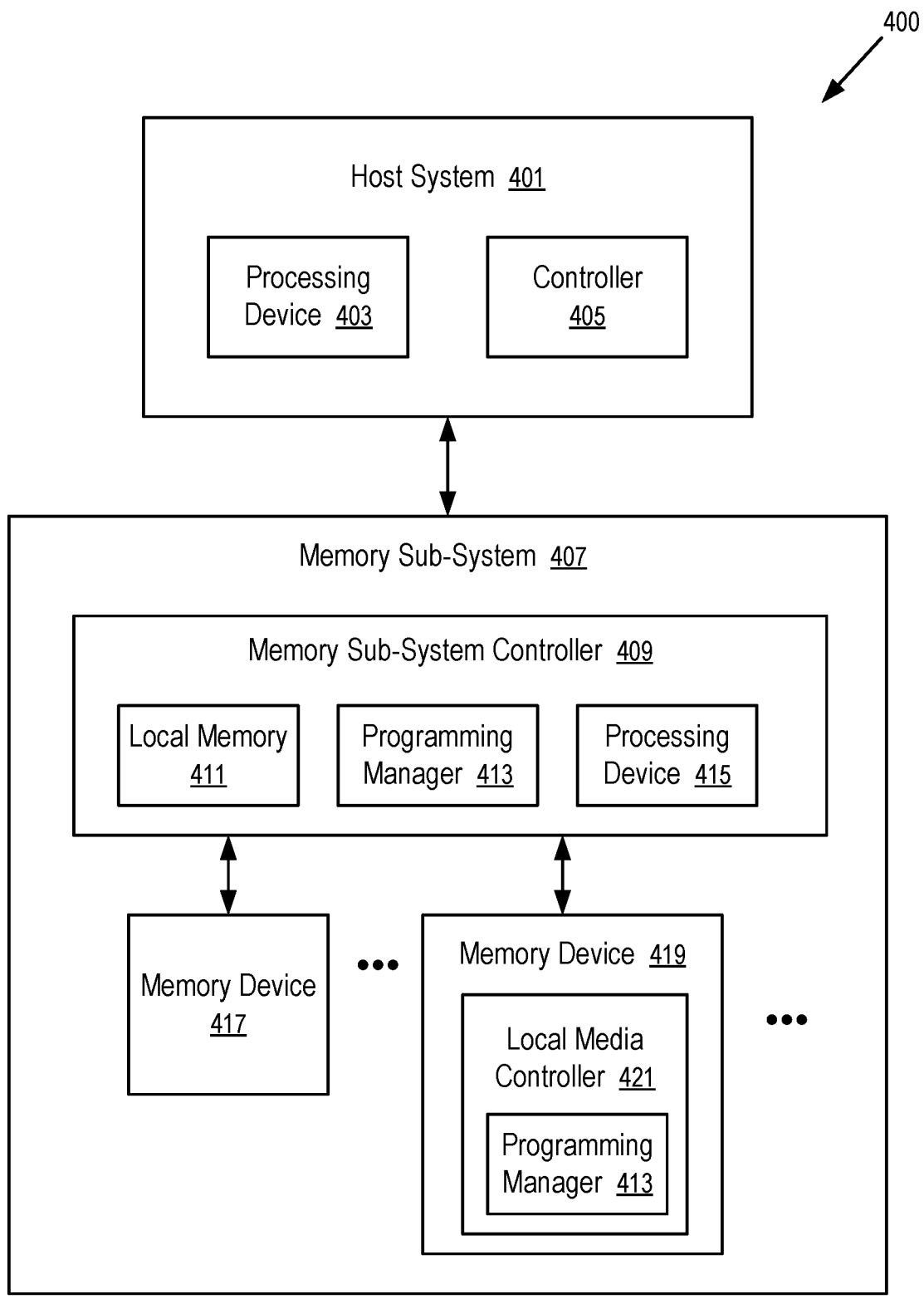
FIG. 4 illustrates an example computing system having a memory sub-system in accordance with some embodiments of the present disclosure.
Figure 5:
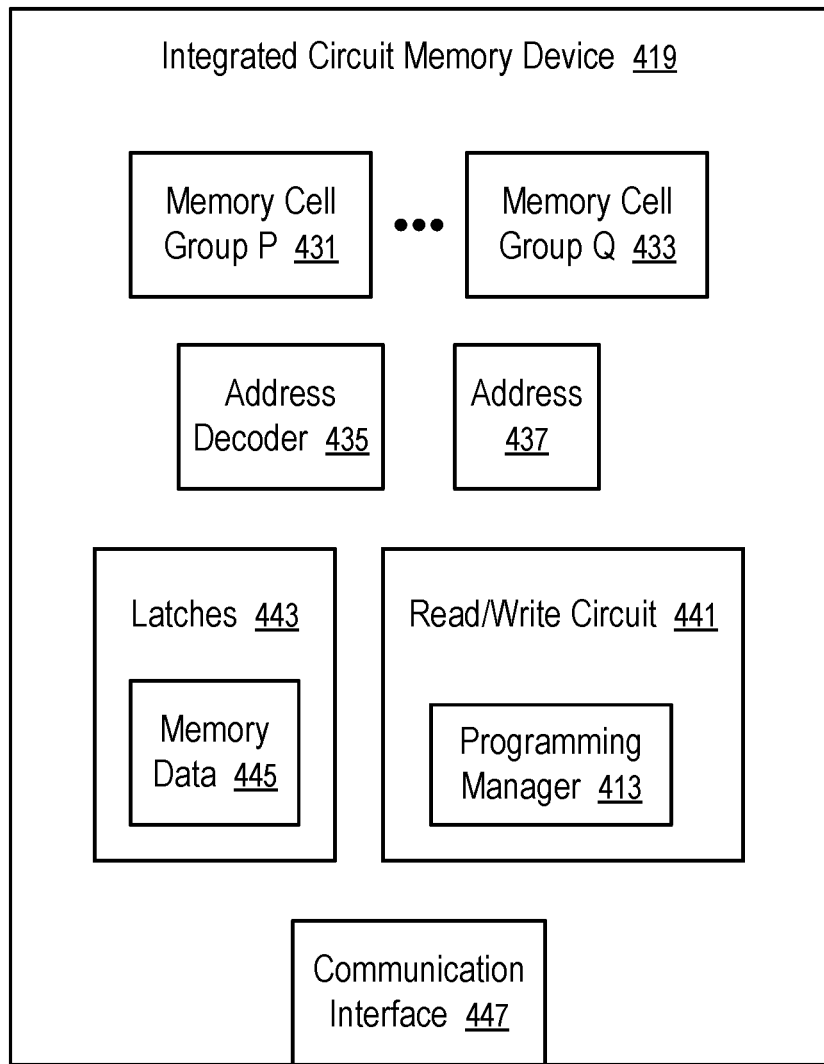
FIG. 5 illustrates an integrated circuit memory device configured according to one embodiment.

For example, the method of FIG. 3 can be performed at least in part via a program manager 205 implemented via instructions executed in the streaming device 109 of FIG. 1, using a technique of FIG. 2, with a storage device 121 that can be a memory sub-system 407 of FIG. 4 implemented using an integrated circuit memory device 419 of FIG. 5.

At block 301, a pool 123 of memory cells formed on an integrated circuit die is used to host a plurality of logical partitions (e.g., 125, ..., 127).

At block 303, the program manager 205 performs wear leveling across the logical partitions (e.g., 125, ..., 127), including a first logical partition (e.g., 127) and a second logical partition (e.g., 125).

At block 305, the program manager 205 receives, from a user via a user interface 203, a write threshold 147 for the first logical partition 127.

At block 307, the program manager 205 tracks an indication (e.g., write count 145) of an accumulated amount of data written into the first logical partition 127.

At block 309, the program manager 205 blocks, in response to the accumulated amount reaching the write threshold 147, write requests 213 to the first logical partition 127. For example, based at least in part on a determination that the accumulated amount has reached the write threshold 147, the program manager 205 avoids writing data to the logical partition 127 after receiving a write request that identifies the logical partition 127.

For example, the streaming device storage device 109 can have a processing device (e.g., a processor or microprocessor) configured via instructions to perform time shift operations in playing back a stream content 103 based on data buffered into the first logical partition 127, such as the buffered stream 133.

Optionally, the program manager 205 can track a plurality of accumulated amounts of data written into the plurality of logical partitions respectively. The program manager 205 can identify the first logical partition as a write-intensive partition to receive the write threshold 147 based on the plurality of accumulated amounts tracked for the plurality of logical partitions respectively.

For example, the program manager 205 can present a user interface 203 to receive the write threshold 147. In some implementations, a further user interface is presented to modify the write threshold. Alternatively, the program manager 205 presents the user interface 203 to receive the write threshold 147 as a one-time configurable option.

For example, the program manager can be implemented in a streaming device 109 having a network interface 111, at least one microprocessor (e.g., processing device 113), and a storage device 121. The storage device has a pool 123 of memory cells formed on an integrated circuit die. The storage device 121 is configured to host the plurality of logical partitions 125, . . . , 127 on the memory cells and perform wear leveling across the logical partitions 125, . . . , 127, including the first logical partition 127 and the second logical partition 125 that share the total program erasure budget of the memory cells in the pool 123. The at least one microprocessor (e.g., processing device 113) is configured (e.g., via instructions) to perform time shift operations based on buffering, data received via the network interface 111 from a streaming server 101 over the Internet 105, into the first logical partition 127. The streaming device is further configured to receive, from a user, the write threshold 147 for the first logical partition 127 and track the indication of the accumulated amount of data written into the first logical partition 127. In response to the accumulated amount reaching the write threshold 147, the streaming device 109 is configured to disable the time shift operations and thus prevent further writing of data into the first logical partition 127.

Optionally, the streaming device 109 has an audio video port 115. The processing device 113 (e.g., a microprocessor) of the streaming device can be configured (e.g., via instructions executed by the microprocessor) to present a content stream on an audio video device 107 (e.g., a television set) through the audio video portion. The streaming device 109 can perform time shift operations on the content stream using the buffered stream 133 written into the first logical partition 127.

In some implementations, the user interface 203 of the streaming device 109 is configured to receive the write threshold 147 in a form of a percentage of a total program erasure budget of the memory cells in the pool 123 shared by the plurality of logical partitions 125, . . . , 127.

In some implementations, the operations of the program manager 205 are implemented primarily in the storage device 121 of a host system, such as the streaming device 109.

For example, a storage device 121 (e.g., as a memory sub-system 407 illustrated in FIG. 4 and/or an integrated circuit memory device 419 illustrated in FIG. 5) can have a communication interface 447 and memory cells formed on an integrated circuit die. A controller (e.g., 141, 409 or 421) of the storage device can be configured via firmware and/or logic circuit to receive, via the communication interface 447, the write threshold 147. The write threshold 147 can be stored (e.g., in the storage device 121) in association with the first logical partition 127. The controller (e.g., 141, 409 or 421) can track an accumulated amount of first data written into the memory cells according to write requests having addresses referencing or identifying the first logical partition 127. The controller (e.g., 141, 409, or 421) can block a write request identifying the first logical partition 127 in response to the accumulated amount (e.g., write count 145) reaches the write threshold 147.

For example, the storage device 121 can have an address map 143. The controller (e.g., 141, 409, or 421) is configured to convert, based on the address map 143, logical addresses specified in the write requests 213 referencing the first logical partition 127 into physical addresses of the memory cells to execute the write requests 213.

For example, in response to commands from the host system (e.g., the streaming device 109), the controller (e.g., 141, 409, or 421) is configured to create and host a plurality of logical partitions (e.g., 125, . . . , 127) on the pool 123 of memory cells. The plurality of logical partitions 125, . . . , 127 are configured to share aggregated program erase budgets of the memory cells in the pool through perform wear leveling performed by the controller (e.g., 141, 409, or 421) across the plurality of logical partitions 125, . . . , 127 and thus leveling wear among the memory cells in the pool 123.

For example, the controller (e.g., 141, 409, or 421) can track the accumulated amounts of data written into the plurality of logical partitions 125, . . . , 127 to identify one or more write intensive partitions to receive a write threshold 147 to limit their write operations.

FIG. 4 illustrates an example computing system 400 that includes a memory sub-system 407 in accordance with some embodiments of the present disclosure. The memory sub-system 407 can include media, such as one or more volatile memory devices (e.g., memory device 417), one or more non-volatile memory devices (e.g., memory device 419), or a combination of such.

A memory sub-system 407 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 400 can be a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

The computing system 400 can include a host system 401 that is coupled to one or more memory sub-systems 407. FIG. 4 illustrates one example of a host system 401 coupled to one memory sub-system 407. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 401 can include a processor chipset (e.g., processing device 403) and a software stack executed by the processor chipset. The processor chipset can include one or more cores, one or more caches, a memory controller (e.g., controller 405) (e.g., NVDIMM controller), and a storage protocol controller (e.g., PCIe controller, SATA controller). The host system 401 uses the memory sub-system 407, for example, to write data to the memory sub-system 407 and read data from the memory sub-system 407.

The host system 401 can be coupled to the memory sub-system 407 via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, or any other interface. The physical host interface can be used to transmit data between the host system 401 and the memory sub-system 407. The host system 401 can further utilize an NVM Express (NVMe) interface to access components (e.g., memory devices 419) when the memory sub-system 407 is coupled with the host system 401 by the PCIe interface. The physical host interface can provide an interface for passing control, address, data, and other signals between the memory sub-system 407 and the host system 401. FIG. 4 illustrates a memory sub-system 407 as an example. In general, the host system 401 can access multiple memory sub-systems via a same communication connection, multiple separate communication connections, and/or a combination of communication connections.

The processing device 403 of the host system 401 can be, for example, a microprocessor, a central processing unit (CPU), a processing core of a processor, an execution unit, a System on a Chip (SoC), etc. In some instances, the controller 405 can be referred to as a memory controller, a memory management unit, and/or an initiator. In one example, the controller 405 controls the communications over a bus coupled between the host system 401 and the memory sub-system 407. In general, the controller 405 can send commands or requests to the memory sub-system 407 for desired access to memory devices 419, 417. The controller 405 can further include interface circuitry to communicate with the memory sub-system 407. The interface circuitry can convert responses received from memory sub-system 407 into information for the host system 401.

The controller 405 of the host system 401 can communicate with controller 409 of the memory sub-system 407 to perform operations such as reading data, writing data, or erasing data at the memory devices 419, 417 and other such operations. In some instances, the controller 405 is integrated within the same package of the processing device 403. In other instances, the controller 405 is separate from the package of the processing device 403. The controller 405 and/or the processing device 403 can include hardware such as one or more integrated circuits (ICs) and/or discrete components, a buffer memory, a cache memory, or a combination thereof. The controller 405 and/or the processing device 403 can be a microcontroller, special purpose logic circuitry (e.g., a field programmable gate array (FPGA), an application specific integrated circuit (ASIC), etc.), or another suitable processor.

The memory devices 419, 417 can include any combination of the different types of non-volatile memory components and/or volatile memory components. The volatile memory devices (e.g., memory device 417) can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 419 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 419 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 419 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 419 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 409 (or controller 409 for simplicity) can communicate with the memory devices 419 to perform operations such as reading data, writing data, or erasing data at the memory devices 419 and other such operations (e.g., in response to commands scheduled on a command bus by controller 405). The controller 409 can include hardware such as one or more integrated circuits (ICs) and/or discrete components, a buffer memory, or a combination thereof. The hardware can include digital circuitry with dedicated (e.g., hard-coded) logic to perform the operations described herein. The controller 409 can be a microcontroller, special purpose logic circuitry (e.g., a field programmable gate array (FPGA), an application specific integrated circuit (ASIC), etc.), or another suitable processor.

The controller 409 can include a processing device 415 (e.g., processor) configured to execute instructions stored in a local memory 411. In the illustrated example, the local memory 411 of the controller 409 includes an embedded memory configured to store instructions for performing various processes, operations, logic flows, and routines that control operation of the memory sub-system 407, including handling communications between the memory sub-system 407 and the host system 401.

In some embodiments, the local memory 411 can include memory registers storing memory pointers, fetched data, etc. The local memory 411 can also include read-only memory (ROM) for storing micro-code. While the example memory sub-system 407 in FIG. 4 has been illustrated as including the controller 409, in another embodiment of the present disclosure, a memory sub-system 407 does not include a controller 409, and can instead rely upon external control (e.g., provided by an external host, or by a processor or controller separate from the memory sub-system).

In general, the controller 409 can receive commands or operations from the host system 401 and can convert the commands or operations into instructions or appropriate commands to achieve the desired access to the memory devices 419. The controller 409 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 419. The controller 409 can further include host interface circuitry to communicate with the host system 401 via the physical host interface. The host interface circuitry can convert the commands received from the host system into command instructions to access the memory devices 419 as well as convert responses associated with the memory devices 419 into information for the host system 401.

The memory sub-system 407 can also include additional circuitry or components that are not illustrated. In some embodiments, the memory sub-system 407 can include a cache or buffer (e.g., DRAM) and address circuitry (e.g., a row decoder and a column decoder) that can receive an address from the controller 409 and decode the address to access the memory devices 419.

In some embodiments, the memory devices 419 include local media controllers 421 that operate in conjunction with memory sub-system controller 409 to execute operations on one or more memory cells of the memory devices 419. An external controller (e.g., memory sub-system controller 409) can externally manage the memory device 419 (e.g., perform media management operations on the memory device 419). In some embodiments, a memory device 419 is a managed memory device, which is a raw memory device combined with a local controller (e.g., local media controller 421) for media management within the same memory device package. An example of a managed memory device is a managed NAND (MNAND) device.

The controller 409 and/or a memory device 419 can include a programming manager 413 configured to control write budget. In some embodiments, the controller 409 in the memory sub-system 407 and/or the controller 421 in the memory device 419 can include at least a portion of the programming manager 413. In other embodiments, or in combination, the controller 405 and/or the processing device 403 in the host system 401 includes at least a portion of the programming manager 413. For example, the controller 409, the controller 405, and/or the processing device 403 can include logic circuitry implementing the programming manager 413. For example, the controller 409, or the processing device 403 (e.g., processor) of the host system 401, can be configured to execute instructions stored in memory for performing the operations of the programming manager 413 described herein. In some embodiments, the programming manager 413 is implemented in an integrated circuit chip disposed in the memory sub-system 407. In other embodiments, the programming manager 413 can be part of firmware of the memory sub-system 407, an operating system of the host system 401, a device driver, or an application, or any combination therein.

For example, the programming manager 413 implemented in the controller 409 and/or the controller 421 can be configured via instructions and/or logic circuit to control write budget.

FIG. 5 illustrates an integrated circuit memory device configured according to one embodiment. For example, the memory devices 419 in the memory sub-system 407 of FIG. 4 can be implemented using the integrated circuit memory device 419 of FIG. 5.

The integrated circuit memory device 419 can be enclosed in a single integrated circuit package. The integrated circuit memory device 419 includes multiple groups 431, . . . , 433 of memory cells that can be formed in one or more integrated circuit dies. A typical memory cell in a group 431 (or group 433) can be programmed to store one or more bits of data.

Some of the memory cells in the integrated circuit memory device 419 can be configured to be operated together for a particular type of operations. For example, memory cells on an integrated circuit die can be organized in planes, blocks, and pages. A plane contains multiple blocks; a block contains multiple pages; and a page can have multiple strings of memory cells. For example, an integrated circuit die can be the smallest unit that can independently execute commands or report status; identical, concurrent operations can be executed in parallel on multiple planes in an integrated circuit die; a block can be the smallest unit to perform an erase operation; and a page can be the smallest unit to perform a data program operation (to write data into memory cells). Each string has its memory cells connected to a common bitline; and the control gates of the memory cells at the same positions in the strings in a block or page are connected to a common wordline. Control signals can be applied to wordlines and bitlines to address the individual memory cells.

The integrated circuit memory device 419 has a communication interface 447 to receive a command having an address 437 from the controller 409 of a memory sub-system 407, retrieve memory data 445 from memory cells identified by the memory address 437, and provide at least the memory data 445 as part of a response to the command. Optionally, the memory device 419 may decode the memory data 445 (e.g., using an error-correcting code (ECC) technique) and provide the decoded data as part of a response to the command. An address decoder 435 of the integrated circuit memory device 419 converts the address 437 into control signals to select a group of memory cells in the integrated circuit memory device 419; and a read/write circuit 441 of the integrated circuit memory device 419 performs operations to determine the memory data 445 stored in the memory cells at the address 437.

The integrated circuit memory device 419 has a set of latches 443, or buffers, to hold memory data 445 temporarily while the read/write circuit 441 is programming the threshold voltages of a memory cell group (e.g., 431 or 433) to store data, or evaluating the threshold voltages of a memory cell group (e.g., 431 or 433) to retrieve data.

Figure 6:
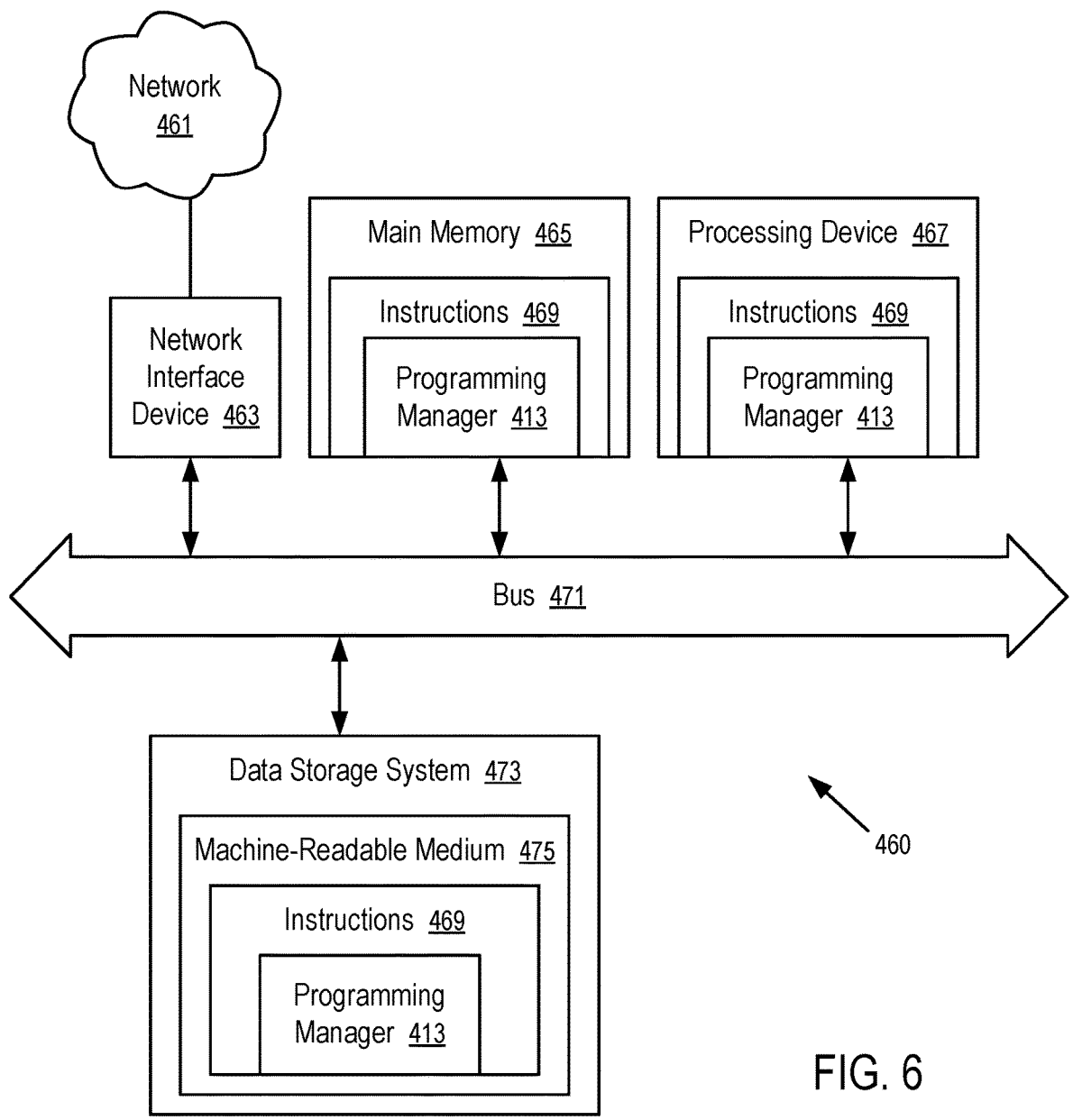
FIG. 6 is a block diagram of an example computer system in which embodiments of the present disclosure can operate.

FIG. 6 illustrates an example machine of a computer system 460 within which a set of instructions, for causing the machine to perform any one or more of the methodologies discussed herein, can be executed. In some embodiments, the computer system 460 can correspond to a host system (e.g., the host system 401 of FIG. 4) that includes, is coupled to, or utilizes a memory sub-system (e.g., the memory sub-system 407 of FIG. 4) or can be used to perform the operations of a programming manager 413 (e.g., to execute instructions to perform operations corresponding to the programming manager 413 described with reference to FIG. 1 to FIG. 5). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 460 includes a processing device 467, a main memory 465 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 473, which communicate with each other via a bus 471 (which can include multiple buses).

The processing device 467 can be one or more general-purpose processing devices such as a microprocessor, a central processing unit, or the like. More particularly, the processing device 467 can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 467 can also be one or more special-purpose processing devices such as an application specific integrated circuit (ASIC), a field programmable gate array (FPGA), a digital signal processor (DSP), network processor, or the like. The processing device 467 is configured to execute instructions 469 for performing the operations and steps discussed herein. The computer system 460 can further include a network interface device 463 to communicate over the network 461.

The data storage system 473 can include a machine-readable medium 475 (also known as a computer-readable medium) on which is stored one or more sets of instructions 469 or software embodying any one or more of the methodologies or functions described herein. The instructions 469 can also reside, completely or at least partially, within the main memory 465 and/or within the processing device 467 during execution thereof by the computer system 460, the main memory 465 and the processing device 467 also constituting machine-readable storage media. The machine-readable medium 475, data storage system 473, and/or main memory 465 can correspond to the memory sub-system 407 of FIG. 4.

In one embodiment, the instructions 469 include instructions to implement functionality corresponding to a programming manager 413 (e.g., the programming manager 413 described with reference to FIG. 1 to FIG. 5). While the machine-readable medium 475 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A non-transitory computer storage medium storing instructions which when executed in a computing device, cause the computing device to perform a method, comprising:
   hosting a plurality of logical partitions on memory cells formed on an integrated circuit die;
   performing wear leveling across the logical partitions, including a first logical partition and a second logical partition;
   receiving, via a command received via user interface, a write threshold for the first logical partition, wherein the write threshold specifies a quantity of program erase cycles in the memory cells utilized to host the first logical partition and a threshold amount of data to be written to the first logical partition;
   tracking an accumulated amount of program erase cycles in the memory cells utilized to host the first logical partition that are consumed based on write requests identifying the first logical partition; and
   blocking, in response to the accumulated amount of program erase cycles and the accumulated amount of data reaching the write threshold, write requests to the first logical partition.

2. The non-transitory computer storage medium of claim 1, wherein the method further comprises:
   performing time shift operations in playing back a stream content based on data buffered into the first logical partition.

3. The non-transitory computer storage medium of claim 1, wherein the method further comprises:
   tracking a plurality of accumulated amounts of data written into the plurality of logical partitions respectively; and
   identifying the first logical partition to receive the write threshold based on the plurality of accumulated amounts tracked for the plurality of logical partitions respectively.

4. The non-transitory computer storage medium of claim 1, wherein the method further comprises:
   presenting the user interface to receive the write threshold as a configurable option.

5. A device, comprising:
   a communication interface;
   memory cells formed on an integrated circuit die; and
   circuitry configured to:
     receive, via the communication interface, a command that indicates a write threshold;
     store, in a portion of the memory cells or in a register on the integrated circuit die, one or more bits that indicate the write threshold, the one or more bits associated with a logical partition, wherein the write threshold indicated by the one or more bits specifies a threshold quantity of program erase cycles in the memory cells utilized to host the logical partition and a threshold amount of bytes to be written to the logical partition;
     determine that an accumulated amount of program erase cycles used to host the logical partition and that an accumulated amount of first data written to the memory cells according to write requests, received in the communication interface, has reached the write threshold based on the accumulated amount of program erase cycles used to host the logical partition satisfying the threshold quantity of program erase cycles and based on the accumulated amount of first data satisfying the threshold amount of bytes based on the write requests identifying the logical partition; and
     avoid writing data to the logical partition after receiving a write request based at least in part on a determination that the accumulated amount of first data and the accumulated amount of program erase cycles has reached the write threshold.

6. The device of claim 5, further comprising:
   a network interface; and
   a processor configured to receive, via the network interface, second data representative of a content stream from a streaming server, and write the second data into the logical partition via the communication interface.

7. The device of claim 6, wherein the content stream includes music, audio, or video, or a combination thereof; and the processing device is further configured to enable time shift operations in playing back the content stream using the second data written into the logical partition.

8. The device of claim 7, further comprising:
   an address map, wherein the circuitry is configured to convert, based on the address map, logical addresses specified in the write requests referencing the logical partition into physical addresses of the memory cells to execute the write requests.

9. The device of claim 8, wherein the circuitry is configured to host a plurality of logical partitions on the memory cells; and the plurality of logical partitions are configured to share aggregated program erase budgets of the memory cells.

10. The device of claim 9, wherein the circuitry is configured to perform wear leveling across the plurality of logical partitions to level wear among the memory cells.

11. The device of claim 10, further comprising:
    an audio video port, wherein the processing device is configured to present the content stream via the audio video port.

12. The device of claim 10, wherein the circuitry is further configured to receive a modification to the write threshold to control write operations in the logical partition.

13. The device of claim 10, wherein the processor is further configured, via instructions, to present a user interface to receive the write threshold.

14. The device of claim 13, wherein the user interface is configured to identify the logical partition to receive the write threshold based on accumulated amounts of data written into the plurality of logical partitions.

15. A streaming device, comprising:
a network interface;
at least one microprocessor; and
a storage device having memory cells formed on an integrated circuit die;
wherein the storage device is configured to host a plurality of logical partitions on the memory cells and perform wear leveling across the logical partitions, including a first logical partition and a second logical partition;
wherein the at least one microprocessor is configured to perform time shift operations based on buffering, data received via the network interface, into the first logical partition;
wherein the streaming device is configured to:
receive, via a command, a write threshold for the first logical partition, wherein the write threshold specifies a threshold quantity of program erase cycles for the first logical partition and a threshold amount of data to be written to the first logical partition; and
track an accumulated amount of program erase cycles in the memory cells utilized to host the first logical partition that are consumed based on write operations associated with the memory cells that address the first logical partition; and
wherein in response to the accumulated amount of program erase cycles and an accumulated amount of data reaching the write threshold, the streaming device is configured to disable the time shift operations.

16. The streaming device of claim 15, further comprising:
an audio video port, wherein the at least one microprocessor is configured to present a content stream via the audio video port and perform the time shift operations on the content stream.

17. The streaming device of claim 16, further configured to present a user interface to receive the write threshold.

18. The streaming device of claim 17, further configured to present a user interface to adjust the write threshold.

19. The streaming device of claim 16, further configured to present a one-time configurable option to receive the write threshold.

20. The streaming device of claim 16, wherein the write threshold is in a form of a percentage of a total program erasure budget of the memory cells shared by the plurality of logical partitions.

* * * * *